United States Patent
Miyake

(10) Patent No.: US 12,356,185 B2
(45) Date of Patent: Jul. 8, 2025

(54) NON-TRANSITORY COMPUTER-READABLE RECORDING MEDIUM STORING COMPUTER-READABLE INSTRUCTIONS FOR TERMINAL DEVICE, COMMUNICATION DEVICE, AND NON-TRANSITORY COMPUTER-READABLE RECORDING MEDIUM STORING COMPUTER-READABLE INSTRUCTIONS FOR SERVER

(71) Applicant: BROTHER KOGYO KABUSHIKI KAISHA, Nagoya (JP)

(72) Inventor: Takeshi Miyake, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/592,148

(22) Filed: Feb. 29, 2024

(65) Prior Publication Data

US 2024/0205672 A1    Jun. 20, 2024

Related U.S. Application Data

(62) Division of application No. 17/323,375, filed on May 18, 2021, now Pat. No. 11,950,093.

(30) Foreign Application Priority Data

May 22, 2020 (JP) ................................. 2020-089950

(51) Int. Cl.
*H04W 12/06* (2021.01)
*H04L 9/08* (2006.01)
(Continued)

(52) U.S. Cl.
CPC ........... *H04W 12/06* (2013.01); *H04L 9/0866* (2013.01); *H04L 9/14* (2013.01); *H04L 61/50* (2022.05);
(Continued)

(58) Field of Classification Search
CPC ............... H04W 12/06; H04W 12/041; H04W 12/0431; H04W 12/55; H04W 60/00;
(Continued)

(56) References Cited

U.S. PATENT DOCUMENTS 9,600,676 B1 * 3/2017 Farmer ................. H04L 9/3271
2015/0002884 A1   1/2015 Okumura et al.
(Continued)

FOREIGN PATENT DOCUMENTS

JP        2017112430 A      6/2017

OTHER PUBLICATIONS

Device Provisioning Protocol Specification Version 1.1.13 created by the Wi-Fi Alliance.
(Continued)

*Primary Examiner* — Khoi V Le
(74) *Attorney, Agent, or Firm* — Scully, Scott, Murphy & Presser, P.C.

(57) ABSTRACT

A terminal device may send to a first server a sending request, and receive from the first server first related information which is related to a first public key of a first communication device in response to the sending request being sent to the first server. The terminal device may send to the first communication device a first authentication request in which the first public key related to the first related information is used in a case where the first related information is received from the first server, and send first connection information to the first communication device in a case where a first authentication response is received from the first communication device in response to the first authentication request being sent to the first communication device. The first connection information may be for establishing a first wireless connection between the first communication device and an external device.

10 Claims, 5 Drawing Sheets

(51) Int. Cl.
    *H04L 9/14*     (2006.01)
    *H04L 61/50*     (2022.01)
    *H04W 12/041*     (2021.01)
    *H04W 12/0431*     (2021.01)
    *H04W 60/00*     (2009.01)
    *H04W 76/10*     (2018.01)
    *H04L 101/622*     (2022.01)

(52) U.S. Cl.
    CPC ..... *H04W 12/041* (2021.01); *H04W 12/0431* (2021.01); *H04W 60/00* (2013.01); *H04W 76/10* (2018.02); *H04L 2101/622* (2022.05)

(58) Field of Classification Search
    CPC ...... H04W 76/10; H04W 4/80; H04L 9/0866; H04L 9/14; H04L 9/3271; H04L 61/50; H04L 2101/622; H04L 2209/80
    See application file for complete search history.

(56) References Cited

U.S. PATENT DOCUMENTS

| | | |
|---|---|---|
| 2015/0036170 A1 | 2/2015 | Miyake |
| 2016/0254916 A1 | 9/2016 | Miyake |
| 2016/0295057 A1 | 10/2016 | Miyake |
| 2018/0048632 A1* | 2/2018 | Cammarota ........ H04L 63/0442 |
| 2018/0332471 A1* | 11/2018 | Zhu ...................... H04L 63/061 |
| 2020/0146101 A1 | 5/2020 | Tsuboi |
| 2020/0154276 A1* | 5/2020 | Minakawa ............ H04W 76/10 |
| 2021/0195423 A1 | 6/2021 | Goto |

OTHER PUBLICATIONS

Office Action dated Oct. 27, 2022 received in U.S. Appl. No. 17/323,375.
Office Action dated Apr. 24, 2023 received in U.S. Appl. No. 17/323,375.
Notice of Allowance dated Nov. 29, 2023 received in U.S. Appl. No. 17/323,375.

* cited by examiner

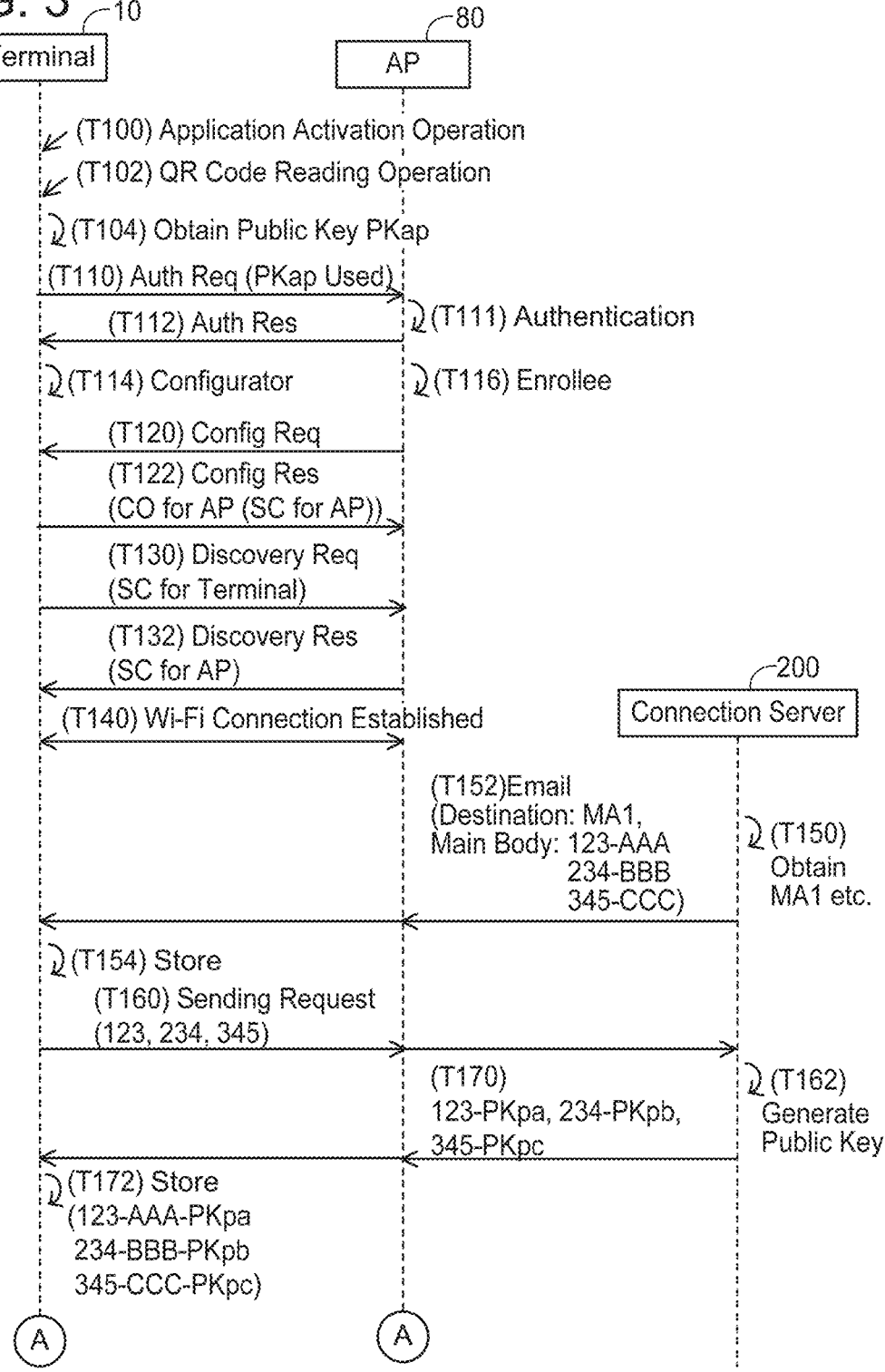

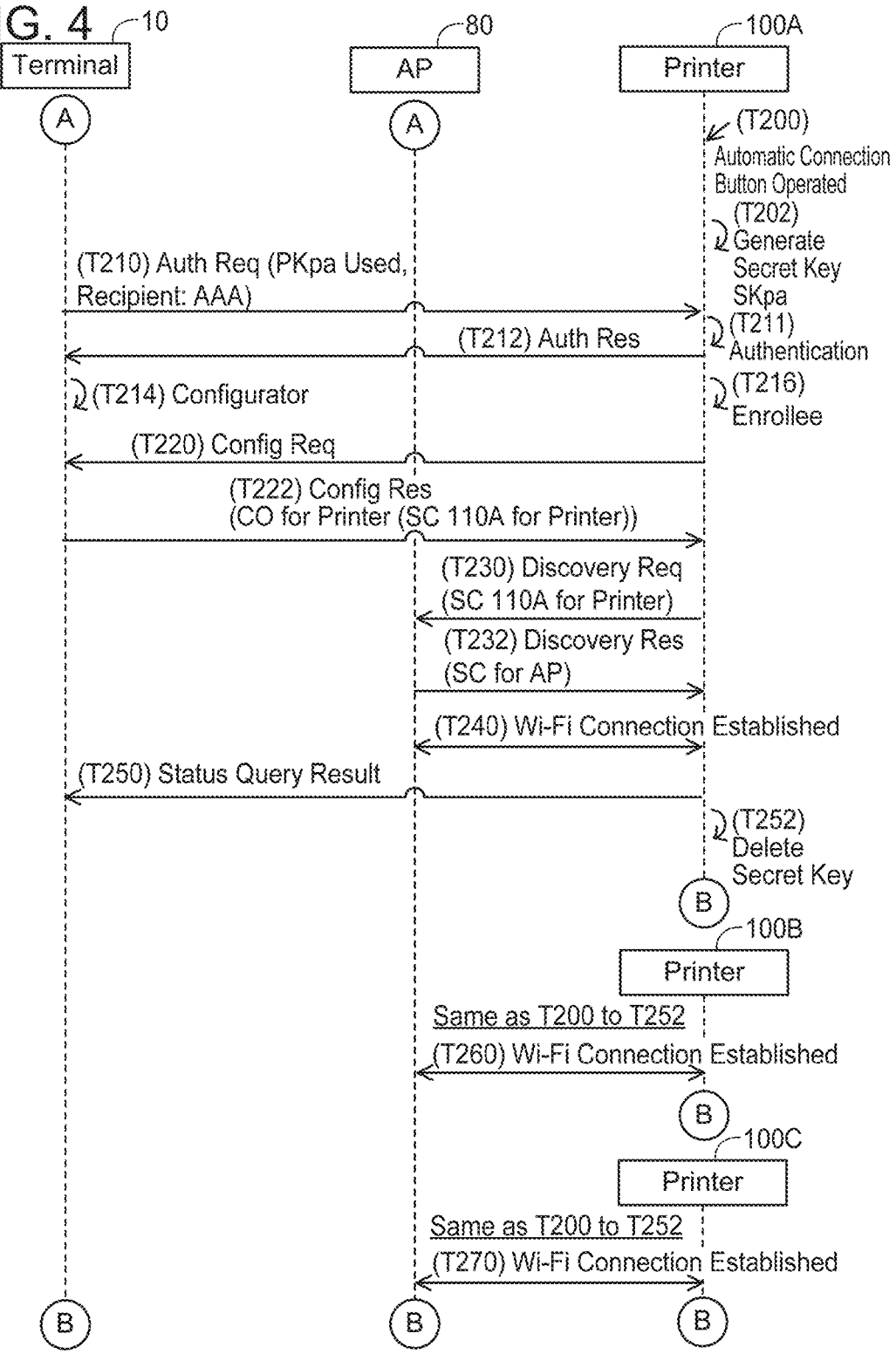

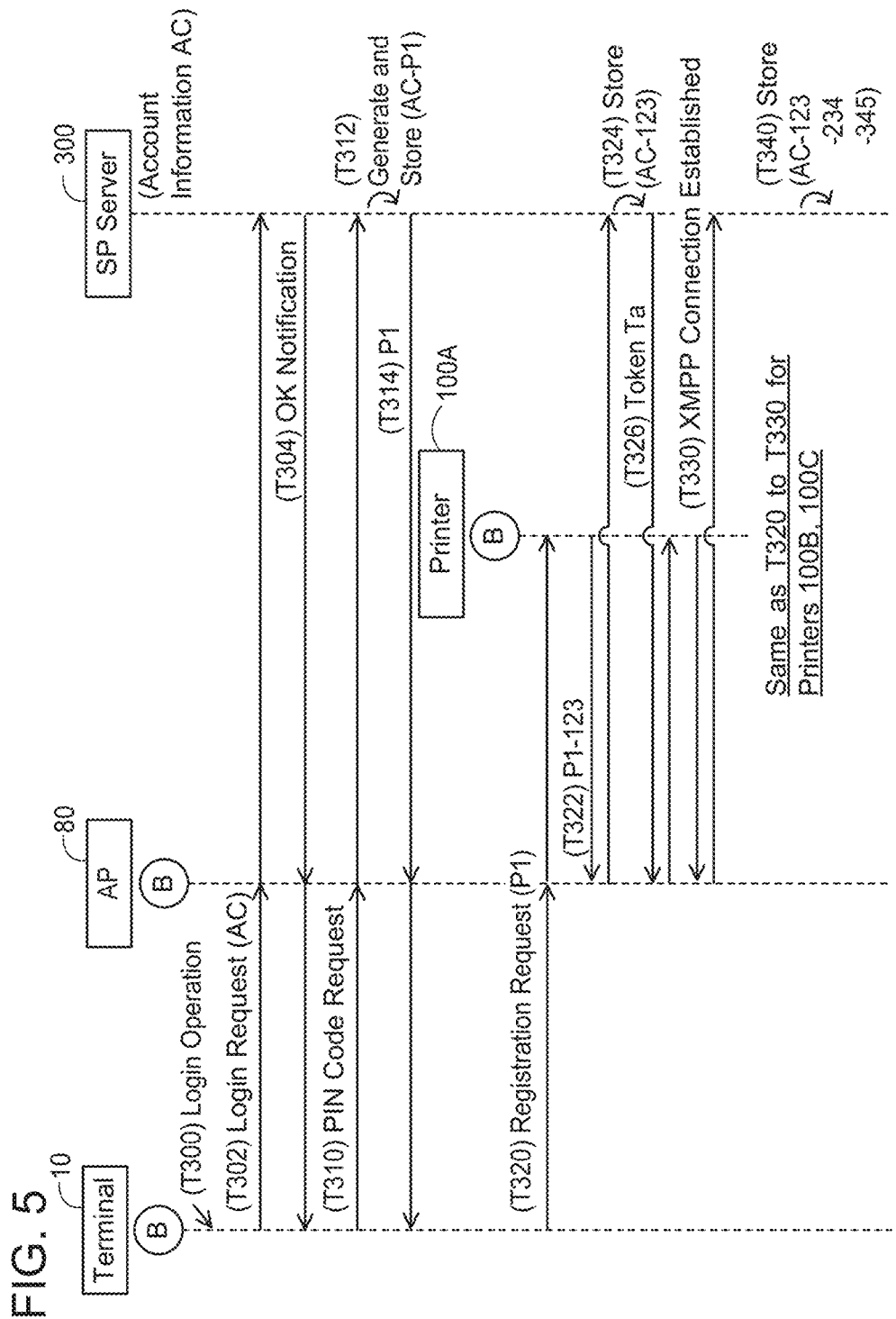

NON-TRANSITORY COMPUTER-READABLE RECORDING MEDIUM STORING COMPUTER-READABLE INSTRUCTIONS FOR TERMINAL DEVICE, COMMUNICATION DEVICE, AND NON-TRANSITORY COMPUTER-READABLE RECORDING MEDIUM STORING COMPUTER-READABLE INSTRUCTIONS FOR SERVER

CROSS-REFERENCE

This application is a divisional application of U.S. application Ser. No. 17/323,375 filed on May 18, 2021, which claims benefit of Japanese Patent Application No. 2020-89950, filed on May 22, 2020, the entire contents of which are incorporated herein by reference.

TECHNICAL FIELD

The disclosure herein discloses art that is used when a wireless connection is to be established between a communication device and an external device.

BACKGROUND ART

A technique of establishing a Wi-Fi connection between a device and an access point in accordance with a Device Provisioning Protocol (DPP) scheme of Wi-Fi standard is known.

SUMMARY

The disclosure herein discloses a novel technique useful when a wireless connection is to be established between a communication device and an external device.

The disclosure herein discloses a non-transitory computer-readable recording medium storing computer-readable instructions for a terminal device. The terminal device may comprise: a wireless interface configured to execute wireless communication, and a computer. The computer-readable instructions, when executed by the computer, may cause the terminal device to: send to a first server a sending request for requesting sending of related information which is related to a public key of a communication device; receive from the first server first related information which is related to a first public key of a first communication device in response to the sending request being sent to the first server; in a case where the first related information is received from the first server, send to the first communication device a first authentication request in which the first public key related to the first related information is used via the wireless interface; and in a case where a first authentication response is received from the first communication device via the wireless interface in response to the first authentication request being sent to the first communication device, send first connection information to the first communication device, the first connection information being for establishing a first wireless connection between the first communication device and an external device.

The disclosure herein also discloses a non-transitory computer-readable recording medium storing computer-readable instructions for a terminal device. The terminal device may comprise: a wireless interface configured to execute wireless communication; and a computer. The computer-readable instructions, when executed by the computer, may cause the terminal device to: receive from a first server a plurality of pieces of related information related to a plurality of public keys of a plurality of communication devices; in a case where the plurality of pieces of related information is received from the first server, send to a first communication device among the plurality of communication devices a first authentication request in which a first public key of the first communication device is used via the wireless interface, the first public key being related to first related information among the plurality of pieces of related information; in a case where a first authentication response is received from the first communication device via the wireless interface in response to the first authentication request being sent to the first communication device, send first connection information to the first communication device via the wireless interface, the first connection information being for establishing a first wireless connection between the first communication device and an external device; in a case where the plurality of pieces of related information is received from the first server, send to a second communication device different from the first communication device among the plurality of communication devices a second authentication request in which a second public key of the second communication device is used via the wireless interface, the second public key being related to second related information different from the first related information among the plurality of pieces of related information; and in a case where a second authentication response is received from the second communication device via the wireless interface in response to the second authentication request being sent to the second communication device, send second connection information to the second communication device via the wireless interface, the second connection information being for establishing a second wireless connection between the second communication device and the external device.

The disclosure herein also discloses a communication device. The communication device may comprise: a wireless interface configured to execute wireless communication; and a controller. The controller may be configured to: receive an authentication request in which a public key of the communication device is used via the wireless interface from a terminal device; send an authentication response to the terminal device via the wireless interface in response to the authentication request being received from the terminal device; in a case where the authentication response is sent to the terminal device, receive connection information from the terminal device via the wireless interface, the connection information being for establishing a wireless connection between the communication device and an external device; in a case where the connection information is received from the terminal device, establish the wireless connection between the communication device and the external device via the wireless interface by using the connection information; receive a registration request from the terminal device via the wireless interface after the connection information has been received from the terminal device; and send to a server device information related to the communication device via the wireless interface and via the external device by using the wireless connection in response to the registration request being received from the terminal device so as to register the device information in the server.

The disclosure herein discloses a non-transitory computer-readable recording medium storing computer-readable instructions for a server. The computer-readable instructions, when executed by a computer of the server, may cause the server to: receive a sending request for requesting sending of related information which is related to a public key of a communication device from a terminal device; and send to the terminal device first related information which is related to a first public key of a first communication device in response to the sending request being received from the terminal device, the first related information being used by the terminal device to send to the first communication device a first authentication request in which the first public key related to the first related information is used.

The terminal device itself and a method executed by the terminal device are also novel and useful. A non-transitory computer-readable recording medium storing computer-readable instructions for the communication device, and a method executed by the communication device are also novel and useful. The first server itself, and a method executed by the first server are also novel and useful. Further, a communication system that comprises two or more of the aforementioned devices (e.g., terminal device and first server) is also novel and useful.

BRIEF DESCRIPTION OF DRAWINGS

FIG. 3 shows a sequence diagram of processes executed by the respective devices;

FIG. 4 shows a sequence diagram continuing from FIG. 3; and

FIG. 5 shows a sequence diagram continuing from FIG. 4.

EMBODIMENT (Configuration of Communication System 2: FIG. 1)

As shown in FIG. 1, a communication system 2 includes a terminal 10, an Access Point (AP) 80, a plurality of printers 100A to 100C, a connection server 200, and a service provider server 300.

The terminal 10 and the AP 80 are installed in a company XXX. The terminal 10 is used by a network administrator of the company XXX. The printers 100A to 100C are purchased by the company XXX and are delivered to the company XXX. The AP 80 is connected to Internet 4. The connection server 200 and the service provider server 300 are established on the Internet 4. Hereinbelow, the service provider server 300 will be termed "SP server 300".

In the present embodiment, a situation will be explained in which a wireless connection according to Wi-Fi standard (hereinbelow termed "Wi-Fi connection") is to be established between the AP 80 and each of the printers 100A to 100C by using the terminal 10 and the connection server 200 will be explained. Further, after the establishment thereof, information related to each of the printers 100A to 100C is registered in the service provider server 300.

Figure 2:
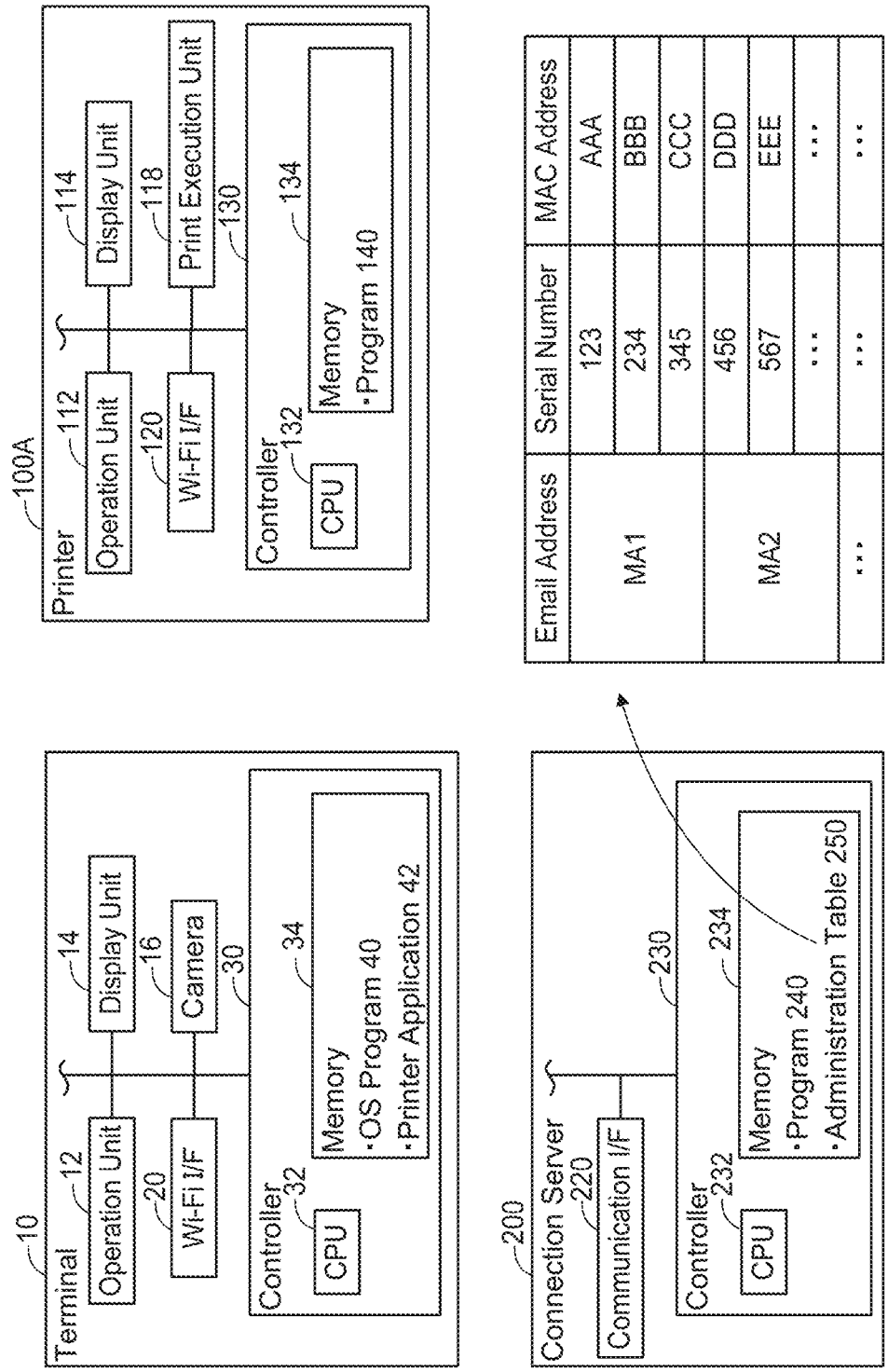
FIG. 2 shows hardware configurations of respective devices.

(Configuration of Terminal 10: FIG. 2)

Next, hardware configurations of the respective devices 10, 100A, and 200 will be described with reference to FIG. 2. The terminal 10 is a portable terminal device such as a portable phone (e.g., smartphone), a PDA, a tablet PC, or the like. In a variant, the terminal 10 may be a desktop PC, a laptop PC, or the like. The terminal 10 includes an operation unit 12, a display unit 14, a camera 16, a Wi-Fi interface 20, and a controller 30. The respective units 12 to 30 are connected to a bus line (reference sign omitted).

The operation unit 12 includes a plurality of keys. A user can input various instructions to the terminal 10 by operating the operation unit 12. The display unit 14 is a display configured to display various types of information. The camera 16 is a device configured to capture images of objects. In the present embodiment, the camera 16 is used to capture a QR code (registered trademark) of the AP 80.

The Wi-Fi interface 20 is a wireless interface configured to execute Wi-Fi communication according to the Wi-Fi standard. The Wi-Fi standard is a wireless communication standard for executing wireless communication according to standard 802.11 and standards complying therewith (e.g., 802.11a, 11b, 11g, 11n, 11ac, etc.) of the IEEE (the Institute of Electrical and Electronics Engineers, Inc.), for example. Especially, the Wi-Fi interface 20 supports a Device Provisioning Protocol (DPP) scheme established by the Wi-Fi Alliance. Details of the DPP scheme are described in the standard "Device Provisioning Protocol Specification Version 1.1.13" created by the Wi-Fi Alliance.

The controller 30 includes a CPU 32 and a memory 34. The CPU 32 is configured to execute various processes according to programs 40 and 42 stored in the memory 34. The memory 34 is configured of a volatile memory, a nonvolatile memory, and the like. An Operating System (OS) program 40 is a program for executing basic operations. A printer application 42 (hereinbelow simply termed "application 42") is a program for executing processes according to the DPP scheme to establish a Wi-Fi connection between the terminal 10 and the AP 80 and to establish a Wi-Fi connection between the AP 80 and each of the printers 100A to 100C. The application 42 may for example be installed in the terminal 10 from a server (not shown) on the Internet provided by a vendor of the printers 100A to 100C.

(Configuration of Printer 100A)

Figure 1:
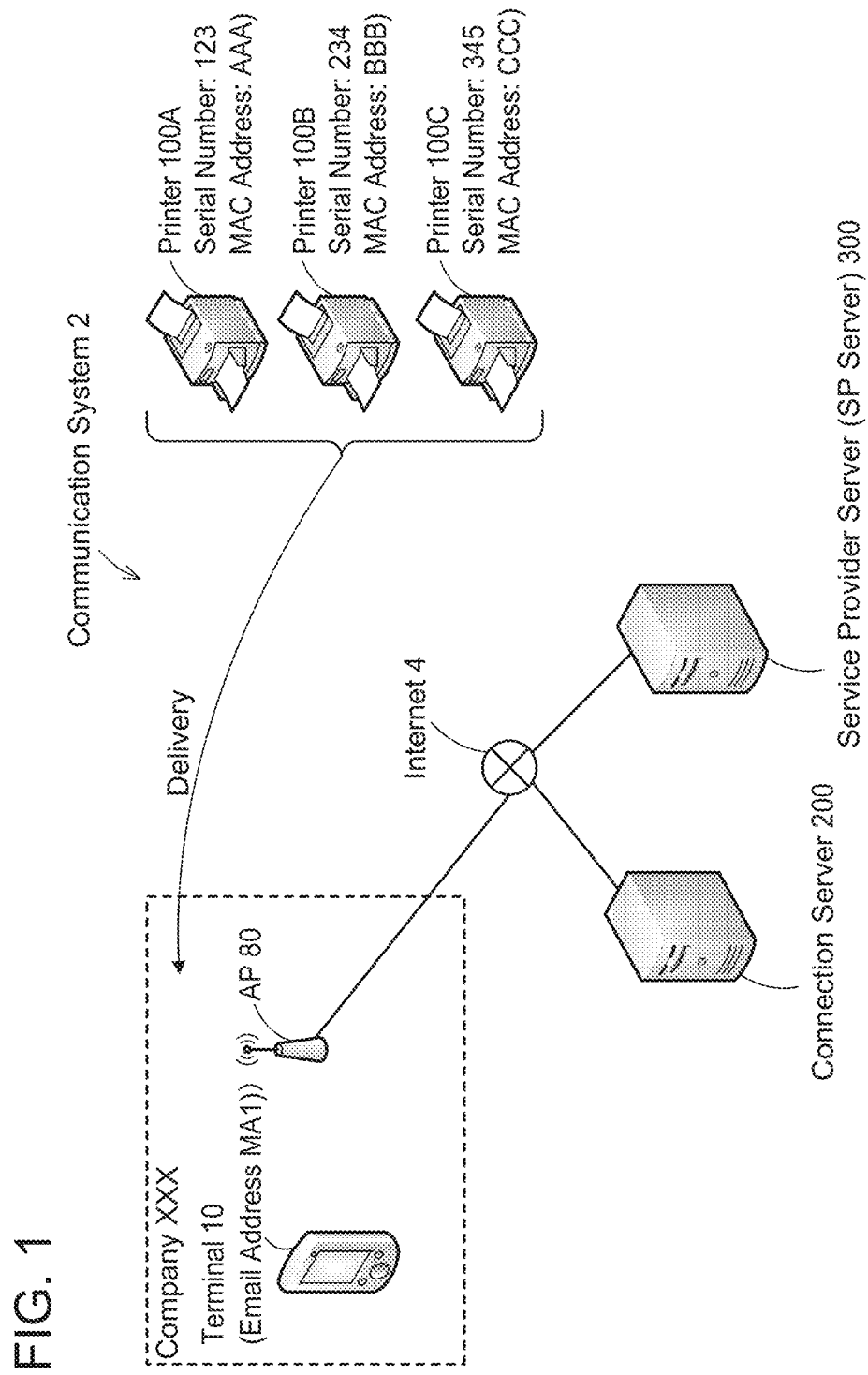
FIG. 1 shows a configuration of a communication system.

The printer 100A is a peripheral device configured to execute a printing function (e.g., a peripheral device of the terminal 10). The printer 100A has a serial number "123" being information identifying this printer (see FIG. 1). The printer 100A includes an operation unit 112, a display unit 114, a print execution unit 118, a Wi-Fi interface 120, and a controller 130. These units 112 to 130 are connected to a bus line (reference sign omitted).

The operation unit 112 includes a plurality of keys. The user can input various instructions to the printer 100A by operating the operation unit 112. The display unit 114 is a display configured to display various types of information. The print execution unit 118 includes a printing mechanism of inkjet scheme, laser scheme, or the like. The Wi-Fi interface 120 is the same as the Wi-Fi interface 20 of the terminal 10. That is, the Wi-Fi interface 120 supports the DPP scheme. The Wi-Fi interface 120 has a MAC address "AAA" being information identifying the Wi-Fi interface (in other words, information identifying the printer) (see FIG. 1). A MAC address is information used upon when a device having this MAC address is to communicate with another device.

The controller 130 includes a CPU 132 and a memory 134. The CPU 132 is configured to execute various processes according to a program 140 stored in the memory 134. The memory 134 is configured of a volatile memory, a nonvolatile memory, and the like.

Each of the other printers 100B, 100C has the same hardware configuration as the printer 100A. The printer 100B has a serial number "234" and a MAC address "BBB". The printer 100C has a serial number "345" and a MAC address "CCC".

(Configuration of Connection Server 200)

The connection server 200 is a server that provides the terminal 10 with a public key for connecting each of the printers 100A to 100C to the AP 80. The connection server 200 is established on the Internet 4 by the vendor of the printers 100A to 100C. The connection server 200 includes a communication interface 220 and a controller 230. Each of the units 220, 230 is connected to a bus line (reference sign omitted).

The communication interface 220 is connected to the Internet 4. The controller 230 includes a CPU 232 and a memory 234. The CPU 232 is configured to execute various processes according to a program 240 stored in the memory 234. The memory 234 is configured of a volatile memory, a nonvolatile memory, and the like.

The memory 234 stores an administration table 250. The administration table 250 is a table for storing an email address of a user of a printer, a serial number of the printer, and a MAC address of the printer in association with each other.

(Configuration of SP Server 300)

The SP server 300 is a server that provides a service to a user of a printer. In the present embodiment, this service is a service of shipping a new consumable article of a printer (e.g., ink in an ink cartridge) to the user when a remaining amount of the consumable article becomes low. In a variant, the SP server 300 may provide another service (e.g., Internet connection service, email printing service, cloud printing service, etc.). The SP server 300 is established on the Internet 4 by the vendor of the printers 100A to 100C. Although not shown, as with the connection server 200, the SP server 300 includes a communication interface and a controller.

(Processes Executed by Devices: FIGS. 3 to 5)

Next, processes executed by the respective devices 10, 80, 100A to 100C, 200, 300 will be described with reference to FIGS. 3 to 5. Hereinbelow, for easier understanding, operations executed by CPUs of the respective devices (e.g., CPU 32, etc.) are described with the respective devices (e.g., terminal 10) as a subject of action instead of describing the CPUs as the subject of action. Further, all the communication executed by the terminal 10 and the printer 100A is executed via the Wi-Fi interfaces 20, 120, and all the communication executed by the connection server 200 is executed via the communication interface 220. As such, hereinbelow, the phrase "via the Wi-Fi interface (or communication interface)" will be omitted when the communication is explained.

(Establishment of Wi-Fi Connection Between Terminal 10 and AP 80: FIG. 3)

As aforementioned, the printers 100A to 100C are delivered to the company XXX. Before a Wi-Fi connection is established between the AP 80 and each of the printers 100A to 100C in the company XXX, a Wi-Fi connection is established between the terminal 10 and the AP 80. A process for establishing this Wi-Fi connection between the terminal 10 and the AP 80 will be described with reference to FIG. 3.

In T100, the terminal 10 accepts an operation of activating the application 42 by the user (i.e., network administrator of the company XXX). All processes hereinbelow executed by the terminal 10 are implemented by the application 42.

A QR code is attached to a housing of the AP 80. The QR code is generated by information such as a public key PKap, a MAC address of the AP 80, etc. being coded. In T102, the terminal 10 accepts an operation to read the QR code using the camera 16.

In T104, the terminal 10 reads and decodes the QR code. As a result, the terminal 10 obtains the information such as the public key PKap, the MAC address of the AP 80, etc. The process of T104 corresponds to Bootstrapping of the DPP scheme.

In T110, the terminal 10 sends to the AP 80 an Authentication Request in which the public key PKap obtained in T104 is used with the MAC address obtained in T104 as a destination. Hereinbelow, an Authentication will be termed "Auth" and a Request will be termed "Req". The Auth Req is a signal requesting execution of authentication. Specifically, the terminal 10 firstly generates a shared key using a secret key of the terminal 10 and the public key PKap of the AP 80, and generates encrypted data by encrypting a random value using the shared key. Then, the terminal 10 sends the Auth Req including a public key of the terminal 10, the encrypted data, and a Capability of the terminal 10 to the AP 80. The Capability of the terminal 10 includes a value indicating that it is capable of operating only as a Configurator of the DPP scheme.

When the Auth Req is received from the terminal 10 in T110, the AP 80 executes authentication of the encrypted data included in the Auth Req in T111. Specifically, the AP 80 generates a shared key using the public key of the terminal 10 included in the Auth Req and a secret key of the AP 80, and then decrypts the encrypted data using the shared key. When the decryption of the encrypted data is successful, that is, when the authentication is successful, the AP 80 executes processes from T112.

In T112, the AP 80 sends an Auth Response including a Capability of the AP 80 to the terminal 10. Hereinbelow, a Response will be termed "Res". The Capability of the AP 80 includes a value indicating the AP 80 is capable of operating only as an Enrollee of the DPP scheme.

When receiving the Auth Res from the AP 80 in T112, the terminal 10 determines that the Capability of the AP 80 (i.e., Enrollee) included in the Auth Res is not incompatible with the Capability of the terminal 10 (i.e., Configurator). Then in T114, the terminal 10 determines to operate as the Configurator. The Configurator is a device that serves a role of sending a Configuration Object (hereinbelow termed "CO") described later to the Enrollee.

In T116, the AP 80 determines to operate as the Enrollee. The Enrollee is a device that serves a role of receiving the CO from the Configurator. The processes of T110 to T116 correspond to Auth of the DPP scheme.

In T120, the terminal 10 receives a Configuration Req from the AP 80. Hereinbelow, a Configuration will be termed "Config". The Config Req is a signal requesting sending of a CO.

When receiving the Config Req from the AP 80, the terminal 10 generates a CO for AP. Specifically, the terminal 10 firstly generates a Signed Connector (hereinbelow termed "SC") for AP being information to be used by the AP 80 for establishing a Wi-Fi connection. The SC for AP includes a group ID being an identifier for identifying a wireless network, for example. Further, the terminal 10 generates the CO for AP including the SC for AP, and sends a Config Res including the CO for AP to the AP 80 in T122. The processes of T120 and T122 correspond to Config of the DPP scheme.

Next, the terminal 10 generates a SC for terminal being information to be used by the terminal 10 to establish the Wi-Fi connection. The SC for terminal includes the same group ID as the group ID included in the SC for AP. Then, in T130, the terminal 10 sends a Discovery Req including the SC for terminal to the AP 80. The Discovery Req is a signal requesting sending of a SC of the communication counterpart.

When receiving the Discovery Req from the terminal 10 in T130, the AP 80 executes authentication of the SC for terminal included in the Discovery Req by using the SC for AP. When the authentication of the SC for terminal is successful, the AP 80 generates a connection key. Then, in T132, the AP 80 sends a Discovery Res including the SC for AP to the terminal 10.

When receiving the Discovery Res from the AP 80 in T132, the terminal 10 executes authentication of the SC for AP included in the Discovery Res by using the SC for terminal. When the authentication of the SC for AP is successful, the terminal 10 generates a connection key. The connection key generated hereof is the same as the connection key generated by the AP 80. That is, the connection key is shared between the terminal 10 and the AP 80. The processes of T130 and T132 correspond to Network Access of the DPP scheme.

Then, the terminal 10 uses the connection key and executes 4-way handshake communication with the AP 80. As a result, in T140, the Wi-Fi connection is established between the terminal 10 and the AP 80. Due to this, a wireless network in which the AP 80 operates as a parent station is established, and the terminal 10 participates in this wireless network as a child station.

(Use of Connection Server 200: FIG. 3)

Next, a situation in which the connection server 200 is used will be described. When the printers 100A to 100C are purchased by the company XXX, a worker in a store that sells the printer 100A, etc. performs the following work. The worker firstly inputs an email address MA1 of the terminal 10 of the company XXX to the connection server 200. The worker further inputs the serial number (e.g., "123") and the MAC address (e.g., "AAA") of each of the printers 100A to 100C to the connection server 200. Due to this, the connection server 200 obtains the email address MA1, the three serial numbers, and the three MAC addresses in T150, and stores these items of information in the administration table 250 (see FIG. 2).

Next, the connection server 200 generates an email and sends this email in T152. This email includes the email address MA1 obtained in T150 as the destination address. Further, the email includes a main body in which the serial numbers and the MAC addresses obtained in T150 are described. Here, for each of the three printers 100A to 100C, the serial number (e.g., "123") and the MAC address (e.g., "AAA") of the printer are described in association with each other in the main body.

In T152, the terminal 10 receives the email from the connection server 200 via an email server (not shown) and the AP 80. Then, in T154, the terminal 10 stores information described in the main body of the email in the memory 34.

In T160, the terminal 10 sends a sending request including the three serial numbers "123", "234", "345" stored in T154 to the connection server 200 via the AP 80. The sending request is a signal requesting sending of a public key of each of the three printers 100A to 100C identified by the three serial numbers.

When receiving the sending request from the terminal 10 in T160, the connection server 200 generates the public key of each of the three printers 100A to 100C in T162. Specifically, the connection server 200 firstly obtains from the administration table 250 the MAC address "AAA" associated with the serial number "123" being one of the three serial numbers included in the sending request. Then, the connection server 200 generates a public key PKpa from the obtained MAC address "AAA" by using a predetermined first formula. Due to this, the public key PKpa of the printer 100A is generated. Similarly, the connection server 200 generates a public key PKpb of the printer 100B from the MAC address "BBB" and generates a public key PKpc of the printer 100C from the MAC address "CCC".

In T170, the connection server 200 sends the generated three public keys PKpa to PKpc to the terminal 10. More specifically, the connection server 200 sends to the terminal 10 information in which, for each of the three serial numbers, the serial number (e.g., "123") and the public key generated based on this serial number (e.g., PKpa) are associated.

When receiving the information such as the public key PKpa to PKpc from the connection server 200 via the AP 80 in T170, the terminal 10 stores this information in the memory 34 in T172. That is, the terminal 10 stores the serial number "123" and the public key PKpa in association with each other. Due to this, the serial number "123", the MAC address "AAA", and the public key PKpa are stored in association with each other. Similarly, the serial number "234", the MAC address "BBB", and the public key PKpb are stored in association with each other, and the serial number "345", the MAC address "CCC", and the public key PKpc are stored in association with each other.

(Establishment of Wi-Fi Connection Between AP 80 and Each of Printers 100A to 100C: FIG. 4)

Next, processes continuing from FIG. 3 will be described with reference to FIG. 4. The process of FIG. 4 is a process of connecting each of the printers 100A to 100C to the AP 80 by using the terminal 10.

When the printers 100A to 100C are delivered to the company XXX, the printer 100A accepts an operation of an automatic connection button by the user in T200. This button may be a hard button or a soft button (e.g., a button displayed on the display unit 114).

When accepting the operation of T200, the printer 100A shifts from a state incapable of sending an Auth Res in response to receiving an Auth Req to a state capable of sending the Auth Res (i.e., a standby state for receiving the Auth Req). Then, in T202, the printer 100A generates a secret key SKpa of the printer 100A from the MAC address "AAA" of the printer 100A by using a predetermined second formula. The secret key SKpa generated hereof constitutes a pair with the public key PKpa of the printer 100A.

As aforementioned, the terminal 10 already has established the Wi-Fi connection with the AP 80 in T140 of FIG. 3. As such, it is highly likely that the printer 100A can establish the Wi-Fi connection with the AP 80. Since the terminal 10 executes processes from T210 after its Wi-Fi connection with the AP 80 has been established, the Wi-Fi connection can suitably be established between the printer 100A and the AP 80.

In T210, the terminal 10 firstly obtains the MAC address "AAA" and the public key PKpa associated therewith from the information stored in T172 of FIG. 3. Then, the terminal 10 sends to the printer 100A an Auth Req in which the obtained public key PKpa is used with the obtained MAC address "AAA" as a destination. The process of T210 is the same as T110 of FIG. 3 except that the MAC address "AAA" and the public key PKpa are used. Here, the Auth Req is sent without intervention of the AP 80 (i.e., without using a wireless network). This also applies to the Auth Res, Config Req, and Config Res described below.

When receiving the Auth Req from the terminal 10 in T210, the printer 100A executes authentication of encrypted data included in the Auth Req in T211. The process of T211 is the same as the process of T111 of FIG. 3. That is, the printer 100A generates a shared key by using the public key of the terminal 10 included in the Auth Req and the secret key SKpa generated in T202. Then, the printer 100A uses the shared key to decrypt the encrypted data.

T212 to T220 are the same as T112 to T120 of FIG. 3 except that the printer 100A is used instead of the AP 80. The terminal 10 generates a SC 110A for printer including the same group ID as the group ID in the SC for AP in T122 of FIG. 3, and sends a Config Res including the SC 110A for printer to the printer 100A in T222.

T230 to T240 are the same as T130 to T140 of FIG. 3 except that the printer 100A is used instead of the terminal 10, and that the SC 110A for printer is used instead of the SC for terminal. Due to this, the Wi-Fi connection is established between the printer 100A and the AP 80. That is, the printer 100A participates as a child station in the wireless network in which the AP 80 operates as a parent station.

When establishing the Wi-Fi connection with the AP 80 in T240, the printer 100A sends to the terminal 10 a Status Query Result (hereinbelow termed "Result") indicating that establishment of the Wi-Fi connection has been completed without intervention of the AP 80 in T250. Due to this, the terminal 10 can be notified of the completion of the establishment of the Wi-Fi connection.

In T252, the printer 100A deletes the secret key SKpa generated in T202. Due to this, it is possible to prevent a third party from simultaneously accessing the printer 100A and obtaining the secret key SKpa.

When accepting the same operation as T200 by the user, the printer 100B executes the same process as T202 and shifts to the standby state for receiving an Auth Req. Then, when receiving the Result from the printer 100A in T250, the terminal 10 sends an Auth Req to the printer 100B as with T210. As above, the terminal 10 starts the process for establishing the Wi-Fi connection between the printer 100B and the AP 80 after the Wi-Fi connection has been established between the printer 100A and the AP 80. Due to this, occurrence of an incident in which the plurality of printers 100A to 100C simultaneously executes the Network Access (i.e., the processes of T230 and T232) with the AP 80 can be prevented. If such an incident occurs, communication load and processing load on the AP 80 become high, as a result of which the AP 80 may fail to establish the Wi-Fi connections with one or more of the printers. According to the present embodiment, since the occurrence of this incident can be prevented, the Wi-Fi connection can suitably be established between the AP 80 and each of the printers 100A to 100C.

By executing the same processes as T200 to T252, the printer 100B establishes the Wi-Fi connection with the AP 80 in T260. After this, the printer 100C executes the same processes as T200 to T252 and establishes the Wi-Fi connection with the AP 80 in T270. Due to this, a state in which the three printers 100A to 100C belong to the same wireless network is established. Due to this, each of the printers 100A to 100C can receive print data from the terminal 10 via the AP 80 and execute printing of an image represented by the print data, for example. Further, each of the printers 100A to 100C can communicate with the SP server 300 on the Internet 4 via the AP 80.

(Registration of Information of Printers 100A to 100C: FIG. 5)

Next, a process of registering the information of each of the printers 100A to 100C in the SP server 300 will be described with reference to FIG. 5. The SP server 300 stores account information AC of the user of the printers 100A to 100C (i.e., network administrator of the company XXX). The SP server 300 further stores an address of the company XXX in association with the account information AC.

In T300, the terminal 10 accepts an operation by the user requesting to log into the SP server 300. This operation includes inputting a Uniform Resource Locator (URL) of the SP server 300 and the account information AC.

In T302, the terminal 10 sends a login request including the inputted account information AC to the SP server 300 via the AP 80 with the inputted URL as a destination.

When receiving the login request from the terminal 10 in T302, the SP server 300 determines that the account information AC included in the login request is already stored (i.e., determines that authentication is successful), and sends an OK notification to the terminal 10 in T304.

When receiving the OK notification from the SP server 300 via the AP 80 in T304, the terminal 10 sends a Personal Identification Number (PIN) code request to the SP server 300 via the AP 80 in T310. The PIN code request is a signal requesting sending of a PIN code.

When receiving the PIN code request from the terminal 10 in T310, the SP server 300 generates a PIN code P1 in T312 and stores the PIN code P1 in association with the account information AC. Then in T314, the SP server 300 sends the PIN code P1 to the terminal 10.

When receiving the PIN code P1 from the SP server 300 via the AP 80 in T314, the terminal 10 sends a registration request including the received PIN code P1 to the printer 100A via the AP 80 in T320. The registration request is a signal requesting to register information in the SP server 300.

When receiving the registration request from the terminal 10 in T320, the printer 100A sends the PIN code P1 included in the registration request and the serial number "123" of the printer 100A to the SP server 300 via the AP 80 in T322.

When receiving the PIN code P1 and the serial number "123" from the printer 100A in T322, the SP server 300 determines that the received PIN code P1 is already stored (see T312) (i.e., determines that authentication is successful), and stores the received serial number "123" in association with the account information AC in T324.

Then, the SP server 300 generates a token Ta, and sends this token Ta to the printer 100A in T326. The token Ta is authentication information for establishing an Extensible Messaging and Presence Protocol (XMPP) connection to be described later.

When receiving the token Ta from the SP server 300 via the AP 80 in T326, the printer 100A uses the token Ta and establishes a XMPP connection, which is a so-called full time connection, with the SP server 300 via the AP 80 in T330. Due to this, the SP server 300 can send signals to the printer 100A beyond a firewall of the wireless network formed by the AP 80 without receiving signals from the printer 100A.

Although not shown, the SP server 300 uses the XMPP connection to send to the printer 100A timing information indicating a timing for sending remaining amount information of a consumable article. Due to this, the printer 100A periodically sends the remaining amount information and the serial number "123" of the printer 100A to the SP server 300 in accordance with the received timing information. Then, the SP server 300 determines whether or not a remaining amount indicated by the received remaining amount information is equal to or less than a threshold. In a case of determining that the remaining amount is equal to or less than the threshold, the SP server 300 identifies the account information AC associated with the received serial number "123" and executes a process for shipping a new consumable article to the address associated with the identified account information AC. As a result, a consumable article shipping service is provided to the user of the printer 100A.

As aforementioned, the terminal 10 sends the registration request to the printer 100A in T320 of FIG. 5 after having received the Result from the printer 100A in T250 of FIG. 4. As such, after the Wi-Fi connection is established between the printer 100A and the AP 80, the terminal 10 can cause the printer 100A to execute the process of sending the serial number "123" to the SP server 300 using this Wi-Fi connection (i.e., via the AP 80). Due to this, the terminal 10 can suitably cause the printer 100A to execute the registration of the serial number "123" in the SP server 300.

After having sent the registration request to the printer 100A in T320, the terminal 10 sequentially sends the registration request including the PIN code P1 to each of the other printers 100B, 100C. Due to this, the same processes as T320 to T330 are executed for each of the printers 100B, 100C. As a result of this, as shown in T340, a state is established in the SP server 300 in which the account information AC and the three serial numbers "123" and the like of the three printers 100A to 100C are associated. Due to this, the SP server 300 can provide the consumable article shipping service to each of the three printers 100A to 100C.

Effects of Embodiment

According to the present embodiment, the terminal 10 can obtain the plurality of public keys PKpa to PKpc generated by the connection server 200 (T170) by sending the sending request including the plurality of serial numbers "123" to "345" of the plurality of printers 100A to 100C to the connection server 200 (T160 of FIG. 3). As such, the terminal 10 can send the Auth Req in which the public key PKpa is used to the printer 100A (T210 of FIG. 4), and further can send the SC 110A for printer to the printer 100A (T222). Due to this, the Wi-Fi connection is established between the printer 100A and the AP 80 (T240). Further, the terminal 10 can send the Auth Req in which the public key PKpb is used to the printer 100B (T210 of FIG. 4 applied to the printer 100B), and further can send the SC for printer to the printer 100B (T222 applied to the printer 100B). Due to this, the Wi-Fi connection is established between the printer 100B and the AP 80 (T260). Similarly, the Wi-Fi connection between the printer 100C and the AP 80 is established (T270). As above, the terminal 10 can suitably cause the Wi-Fi connections to be established between the AP 80 and each of the printers 100A to 100C.

For example, a comparative example will be assumed in which the user of the terminal 10 causes each of the printers 100A to 100C to display corresponding one of the public keys PKpa to PKpc and causes the terminal 10 to read each of the displayed public keys PKpa to PKpc. In this configuration of the comparative example as well, the terminal 10 can obtain the public keys PKpa to PKpc of the printers 100A to 100C, and can send the Auth Req and the SC for printer to each of the printers 100A to 100C. However, according to the configuration of the comparative example, the user must perform an operation for causing the public key to be displayed and an operation for reading the displayed public key in each of the plurality of printers 100A to 100C. Due to this, work burden on the user is high. Contrary to this, according to the present embodiment, the user does not have to perform such operations, thus can easily cause the Wi-Fi connections to be established between the AP 80 and each of the plurality of printers 100A to 100C by using the terminal 10.

Further, according to the present embodiment, the printer 100A receives the SC 110A for printer from the terminal 10 (T222 of FIG. 4) and can establish the Wi-Fi connection with the AP 80 by using this SC 110A for printer (T240). The printer 100A further receives the registration request from the same terminal 10 (T320), and can register the serial number "123" in the SP server 300 in response to the registration request by using the aforementioned Wi-Fi connection (T322).

Especially, since the printer 100A receives the registration request including the PIN code Pb from the terminal 10 (T320), the printer 100A can send the serial number "123" and the PIN code P1 to the SP server 300. Due to this, the user does not have to perform an operation of inputting the PIN code P1 to the printer 100A, and thus can easily register the serial number "123" in the SP server 300. Similarly, the user can easily register the serial numbers "234", "345" of the printers 100B, 100C in the SP server 300. Especially in the present embodiment, a common single PIN code P1 is used for the printers 100A to 100C. As such, the SP server 300 does not have to generate and manage a unique PIN code for each of the plurality of printers 100A to 100C. Due to this, processing load on the SP server 300 can be reduced.

CORRESPONDING RELATIONSHIP

The terminal 10, printer 100A, printer 100B, AP 80 are respectively an example of "terminal device", "first communication device (or communication device)", "second communication device", and "external device". The connection server 200 is an example of "first server" and "server" that receives a sending request. The SP server 300 is an example of "second server", and "server" in which device information is registered. The public key PKap is an example of "specific public key". The public key PKpa is an example of "first public key" and "first related information". The public key PKpb is an example of "second public key" and "second related information". The secret key SKpa is an example of "secret key". The serial number "123" of the printer 100A is an example of "identification information" included in "sending request", and "first device information (or device information)". The MAC address "AAA" of the printer 100A is an example of "identification information" used to generate "secret key". The serial number "234" of the printer 100B is an example of "second device information". The PIN code P1 is an example of "registration code". The Result in T250 of FIG. 4 is an example of "establishment information".

The Auth Req in T110, the Auth Res in T112, and SC for AP in T122 of FIG. 3 are respectively an example of "specific authentication request", "specific authentication response", and "specific connection information". The Auth Req in T210, the Auth Res in T212, and SC 110A for printer in T222 of FIG. 4 are respectively an example of "first authentication request (or authentication request)", "first authentication response (or authentication response)", and "first connection information (or connection information)". The Auth Req in T210, the Auth Res in T222, and the SC for printer in T222 applied to the printer 100B are respectively an example of "second authentication request", "second authentication response", and "second connection information". The Wi-Fi connection in T140 of FIG. 3, the Wi-Fi connection in T240, and the Wi-Fi connection in T260 of FIG. 4 are respectively an example of "specific wireless connection", "first wireless connection (or wireless connection)", and "second wireless connection". The registration request in T320 of FIG. 5 is an example of "first registration request (or registration request)". The registration request in T320 applied to the printer 100B is an example of "second registration request".

The process of T110, the process of T122, and the process of T140 of FIG. 3 are respectively an example of "send to the external device a specific authentication request", "send specific connection information", and "establish the specific wireless connection". The process of T160 and the process of T170 of FIG. 3 are respectively an example of "send to a first server a sending request" and "receive from the first server first related information". The process of T210, the process of T222, and the process of T250 of FIG. 4 are respectively an example of "send to the first communication device a first authentication request", send first connection information", and "receive from the first communication device establishment information". The process of T210 and the process of T222 of FIG. 4 applied to the printer 100B are respectively an example of "send to a second communication device a second authentication request" and "send second connection information". The process of T314 and the process of T320 of FIG. 5 are respectively an example of "receive a registration code" and "send a first registration request". The process of T320 applied to the printer 100B is an example of "send a second registration request".

The process of T202, the process of T210, the process of T211, the process of T212, the process of T222, the process of T240, and the process of T252 of FIG. 4 are respectively an example of "generate a secret key", "receive an authentication request", "execute authentication", "send an authentication response", "receive connection information", "establish the specific wireless connection", and "delete the secret key". The process of T320 and the process of T322 of FIG. 5 are respectively an example of "receive a registration request" and "send to the server device information so as to register the device information in the server".

The process of T160, the process of T162, and the process of T170 of FIG. 3 are respectively an example of "receive a sending request", "generate the first public key", and "send to the terminal device first related information".

(Variant 1) The connection server 200 may store, in the administration table 250, account information of the user of the terminal 10 instead of the email address MA1. In this case, T152 of FIG. 3 is not executed. In T160, the terminal 10 sends a sending request that does not include the serial number "123" to "345" but includes this account information to the connection server 200. In T162, the connection server 200 generates the plurality of public keys PKpa to PKpc from the plurality of MAC addresses "AAA" to "CCC" associated with this account information. In general terms, the "sending request" may not include the identification information for identifying the first communication device.

(Variant 2) The connection server 200 may send an email not including the MAC address "AAA" but including the serial numbers "123" to "345" to the terminal 10 in T152 of FIG. 3. Further, the connection server 200 may not execute T162, and may send the plurality of MAC addresses "AAA" to "CCC" associated with the plurality of serial numbers "123" to "345" included in the sending request to the terminal 10 in T170. In this case, the terminal 10 generates the plurality of public keys PKpa to PKac from the plurality of MAC addresses "AAA" to "CCC", and stores the generated plurality of public keys PKpa to PKpc in T172. In the present variant, the MAC address "AAA" and the MAC address "BBB" are respectively an example of "first related information" and "second related information". Further, in general terms, the "first public key" may not be generated by the first server.

(Variant 3) The connection server 200 may generate the plurality of public keys PKpa to PKpc from the plurality of MAC addresses "AAA" to "CCC" at the timepoint of T150 of FIG. 3, and may send an email including the generated plurality of public keys PKpa to PKpc to the terminal 10 in T152. In this case, T160 to T170 may be omitted. In the present variant, "send to a first server a sending request" may be omitted.

(Variant 4) The terminal 10 may not execute the processes in FIG. 5. In the present variant, "send a first registration request", "send a second registration request", and "receive a registration code" may be omitted.

(Variant 5) T250 of FIG. 4 may be omitted. That is, after having sent the Config Res to the printer 100A in T222 of FIG. 4, the terminal 10 may send the registration request to the printer 100A in T320 of FIG. 5 without receiving the Result from the printer 100A. In the present variant, receive from the first communication device establishment information may be omitted.

(Variant 6) T140 of FIG. 3 may be omitted. In this case, the terminal 10 may receive the email from the connection server 200 in T152 via a cellular interface (i.e., by using such as 3G, 4G, 5G, etc.) or via a wired interface, for example. In the present variant, "establish the specific wireless connection" by the "terminal device" may be omitted.

(Variant 7) In T160 of FIG. 3, the terminal 10 may send the sending request to the connection server 200 via the cellular interface or via the wired interface, and may receive the public key PKpa to PKpc from the connection server 200 via the cellular interface or via the wired interface in T170. Further, the terminal 10 may execute communication with the SP server 300 via the cellular interface or via the wired interface in T302 to T314 of FIG. 5. In general terms, a communication scheme between the "terminal device" and the "first (or second) server" is not particularly limited.

(Variant 8) The printers 100B, 100C may not be used, and only the printer 100A may be used. That is, in T152 of FIG. 3, an email including only the serial number "123" and the MAC address "AAA" of the printer 100A may be sent, and a sending request including only the serial number "123" may be sent in T160. In this case, T200 to T252 of FIG. 4 applied to the printers 100B, 100C and T260 and T270 of FIG. 4 may be omitted. Further, T320 to T330 of FIG. 5 applied to the printers 100B, 100C and T340 of FIG. 5 may be omitted. In the present variant, "send to a second communication device a second authentication request", "send second connection information", and "send a second registration request" may be omitted.

(Variant 9) The terminal 10 may send a PIN code request requesting sending of three PIN codes for the three printers 100A to 100C to the SP server 300 in T310 of FIG. 5, and may receive the three PIN codes from the SP server 300 in T314. In this case, the terminal 10 sends a registration request including a first PIN code to the printer 100A, sends a registration request including a second PIN code different from the first PIN code to the printer 100B, and sends a registration request including a third PIN code different from the first and second PIN codes to the printer 100C. In general terms, instead of the "one registration code", two or more other registration codes may be used.

(Variant 10) The printer 100A may store the secret key SKpa in advance at the time of shipment of the printer 100A. In this case, T202 of FIG. 4 may be omitted. Further, T252 may not be executed. In the present variant, "generate a secret key" and "delete the secret key" may be omitted.

(Variant 11) The connection server 200 and the SP server 300 may be configured as a single server. In general terms, the "second server" may be a server different from the "first server" as in the above embodiment, or may be the same server as the "first server" as in the present variant.

(Variant 12) In T322 of FIG. 5, the printer 100A may send other information of the printer 100A instead of the serial number "123" to the SP server 300. The other information may for example be a printer name, a model name, and/or a MAC address of the printer 100A, for example. In the present variant, the other information is an example of the "first device information (or second device information)".

(Variant 13) The public key PKpa and the secret key SKpa of the printer 100A may not be generated from the MAC address "AAA" of the printer 100A. The public key PKpa and the secret key SKpa may for example be generated from the serial number "123" of the printer 100A. In the present variant, the serial number "123" is an example of the "identification information".

(Variant 14) The "first communication device (or communication device)" may not be a printer, and may be another device such as a scanner, multi-function device, a portable terminal, a PC, a server, or the like.

(Variant 15) The "external device" may not be the AP 80, and may for example be the terminal 10. That is, in the present variant, a Wi-Fi connection is established between the terminal 10 and the printer 100A.

(Variant 16) In the embodiment as above, the processes of FIGS. 3 to 5 are implemented by software (i.e., programs 40, 42, 140, 240). Instead of this, at least one of the processes may be implemented by hardware such as a logic circuit.

What is claimed is:

1. A non-transitory computer-readable recording medium storing computer-readable instructions for a terminal device, wherein
the terminal device comprises:
a wireless interface configured to execute wireless communication; and
a computer,
wherein the computer-readable instructions, when executed by the computer, cause the terminal device to:
send a single sending request to a first server;
receive from the first server a plurality of pieces of related information related to a plurality of public keys of a plurality of communication devices in response to the single sending request having been sent to the first server;
in a case where the plurality of pieces of related information is received from the first server, send to a first communication device among the plurality of communication devices a first authentication request in which a first public key of the first communication device is used via the wireless interface, the first public key being related to first related information among the plurality of pieces of related information;
in a case where a first authentication response is received from the first communication device via the wireless interface in response to the first authentication request being sent to the first communication device, send first connection information to the first communication device via the wireless interface, the first connection information being for establishing a first wireless connection between the first communication device and an external device;
in a case where the plurality of pieces of related information is received from the first server, send to a second communication device different from the first communication device among the plurality of communication devices a second authentication request in which a second public key of the second communication device is used via the wireless interface, the second public key being related to second related information different from the first related information among the plurality of pieces of related information; and
in a case where a second authentication response is received from the second communication device via the wireless interface in response to the second authentication request being sent to the second communication device, send second connection information to the second communication device via the wireless interface, the second connection information being for establishing a second wireless connection between the second communication device and the external device.

2. The non-transitory computer-readable recording medium as in claim 1, wherein
the computer-readable instructions, when executed by the computer, further cause the terminal device to:
send a first registration request to the first communication device via the wireless interface after the first connection information has been sent to the first communication device, the first registration request being a signal for requesting the first communication device to execute a first registration process, and the first registration process being a process in which the first communication device sends to a second server first device information related to the first communication device via the external device by using the first wireless connection so as to register the first device information in the second server; and
send a second registration request to the second communication device via the wireless interface after the second connection information has been sent to the second communication device, the second registration request being a signal for requesting the second communication device to execute a second registration process, and the second registration process being a process in which the second communication device sends to the second server second device information related to the second communication device via the external device by using the second wireless connection so as to register the second device information in the second server.

3. The non-transitory computer-readable recording medium as in claim 2, wherein
the computer-readable instructions, when executed by the computer, further cause the terminal device to:
receive from the second server one registration code to be used for both registration of the first device information and registration of the second device information,
wherein the first registration request including the one registration code is sent to the first communication device after the first connection information has been sent to the first communication device and the one registration code has been received from the second server,
the first registration process includes the first communication device sending to the second server the first device information and the one registration code included in the first registration request,
the second registration request including the one registration code is sent to the second communication device after the second connection information has been sent to the second communication device and the one registration code has been received from the second server, and
the second registration process includes the second communication device sending to the second server the second device information and the one registration code included in the second registration request.

4. A communication device, comprising:
a wireless interface configured to execute wireless communication;
a processor;
a memory configured to store computer readable instructions, when executed by the processor, cause the communication device to:
receive an authentication request in which a public key of the communication device is used via the wireless interface from a terminal device;
send an authentication response to the terminal device via the wireless interface in response to the authentication request being received from the terminal device;
in a case where the authentication response is sent to the terminal device, receive connection information from the terminal device via the wireless interface, the connection information being for establishing a wireless connection between the communication device and an external device;
in a case where the connection information is received from the terminal device, establish the wireless connection between the communication device and the external device via the wireless interface by using the connection information;
receive a registration request from the terminal device via the wireless interface after the connection information has been received from the terminal device; and
send to a server device information related to the communication device via the wireless interface and via the external device by using the wireless connection in response to the registration request being received from the terminal device so as to register the device information in the server.

5. The communication device as in claim 4, wherein the computer readable instructions, when executed by the processor, further cause the communication device to:
generate a secret key corresponding to the public key by using identification information for identifying the communication device; and in a case where the authentication request is received from the terminal device, execute authentication of information included in the authentication request by using the generated secret key,
wherein in a case where the authentication is successful, the authentication response is sent to the communication device, and wherein the computer readable instructions, when executed the by processor, further cause the communication device to:
in a case where the authentication is successful, delete the secret key from the communication device.

6. The communication device as in claim 5, wherein
the identification information is a MAC address of the wireless interface.

7. The communication device as in claim 4, wherein
the registration request includes a registration code that has been sent to the terminal device from the server, the registration code being to be used for registration of the device information, and
the device information is registered in the server by sending to the server the device information and the registration code included in the registration request.

8. The non-transitory computer-readable recording medium as in claim 1, wherein
the computer-readable instructions, when executed by the computer, further cause the terminal device to:
receive from the first server an email containing identification information for each of the plurality of communication devices.

9. The non-transitory computer-readable recording medium as in claim 8, wherein the identification information includes a serial number of a respective communication device.

10. The non-transitory computer-readable recording medium as in claim 8, wherein the single sending request includes the identification information for each of the plurality of communication devices.

* * * * *